1,835,077

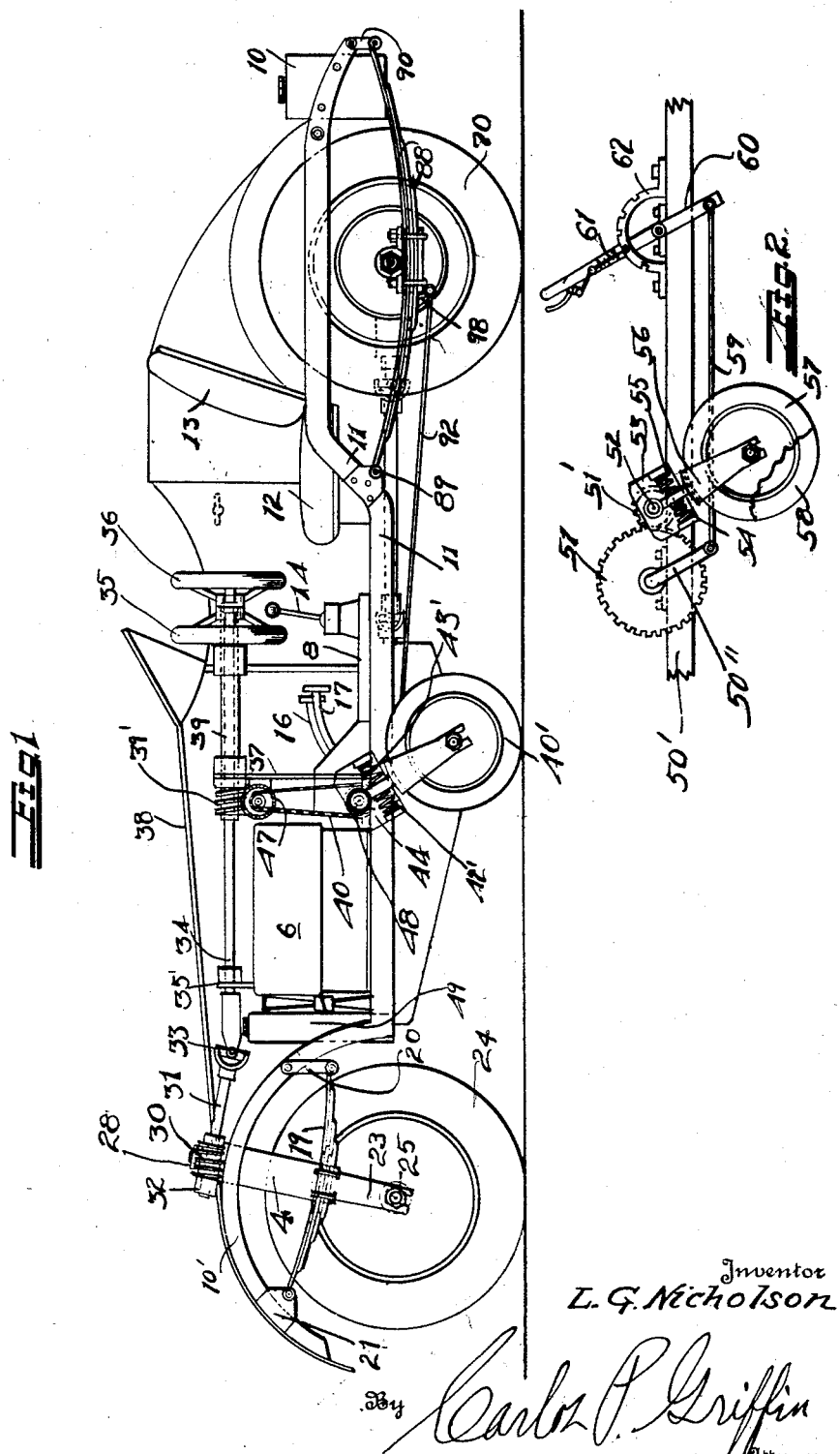
Dec. 8, 1931.  L. G. NICHOLSON  1,835,077
MOTOR VEHICLE
Filed July 23, 1928   3 Sheets-Sheet 1
Inventor
L. G. Nicholson
By Carlos P. Griffin
Attorney Dec. 8, 1931.  L. G. NICHOLSON  1,835,077
MOTOR VEHICLE
Filed July 23, 1928   3 Sheets-Sheet 2
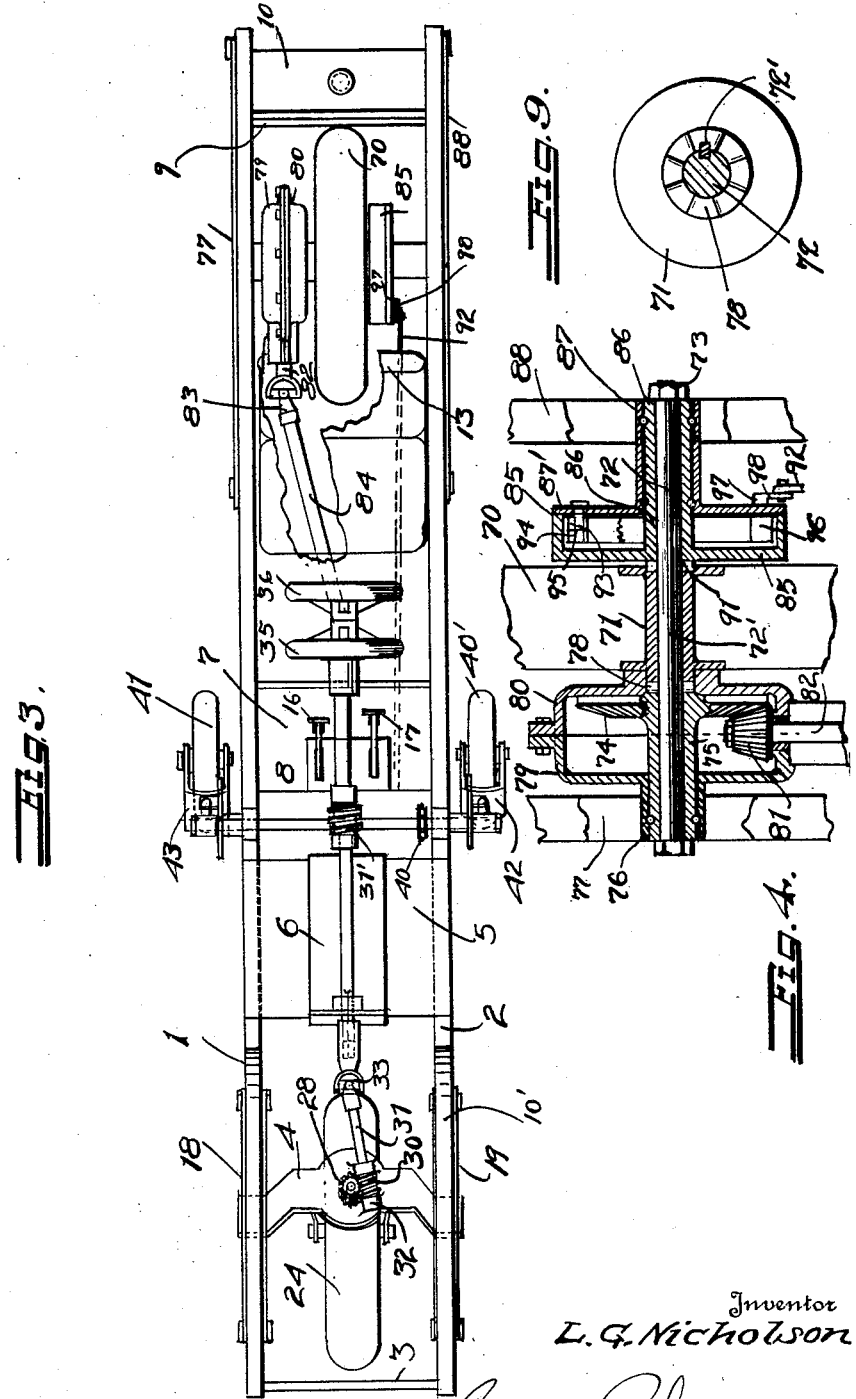
Inventor
L. G. Nicholson
By Carlos P. Griffin
Attorney Dec. 8, 1931. L. G. NICHOLSON 1,835,077
MOTOR VEHICLE
Filed July 23, 1928 3 Sheets-Sheet 3
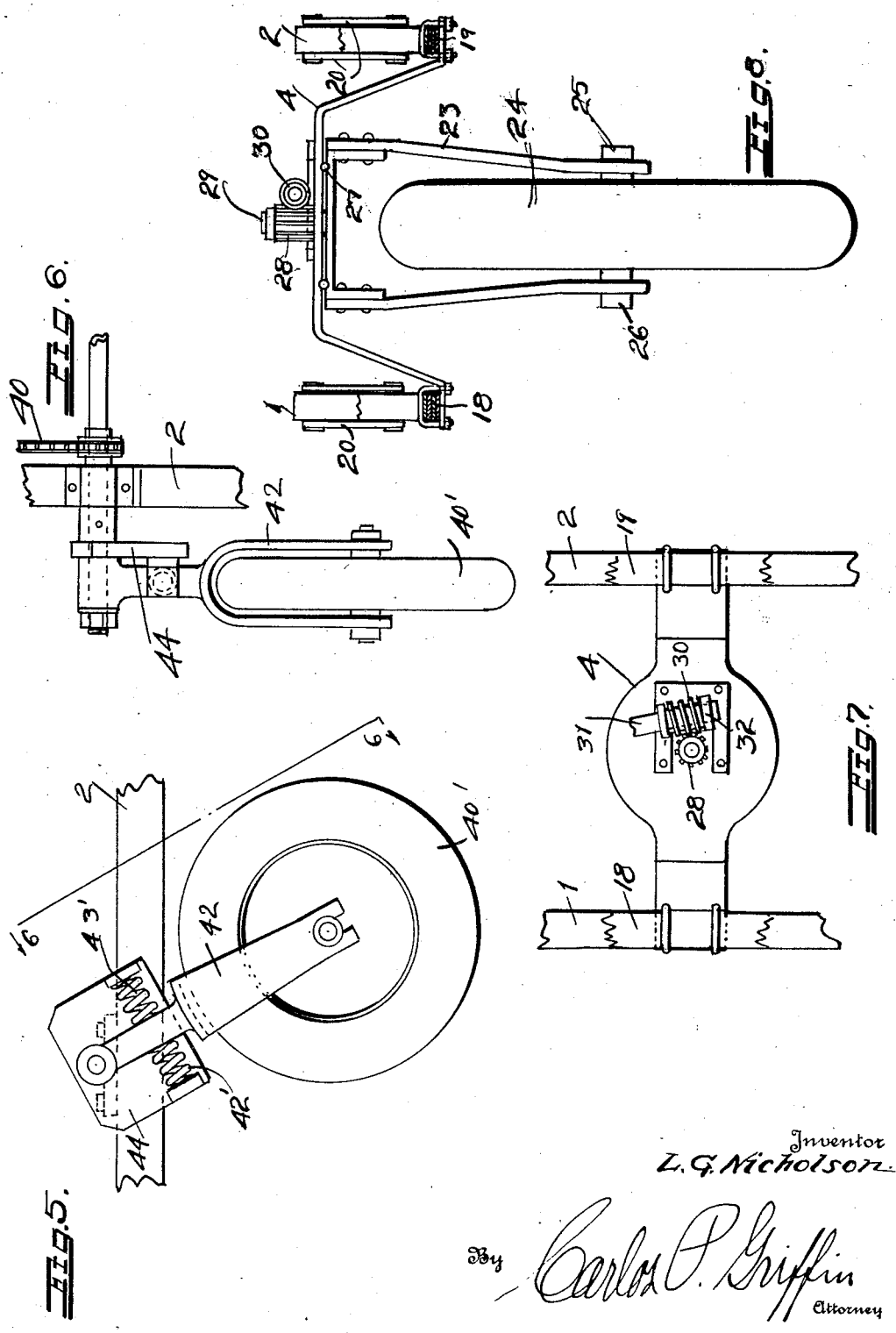
Inventor
L. G. Nicholson
By Carlos P. Griffin
Attorney Patented Dec. 8, 1931

UNITED STATES PATENT OFFICE

LESLIE G. NICHOLSON, OF ST. HELENA, CALIFORNIA

MOTOR VEHICLE

Application filed July 23, 1928. Serial No. 294,713.

This invention relates to a motor vehicle of the two wheeled type which is provided with emergency wheels to enable it to pass through traffic without requiring the driver to hold the vehicle up when it is travelling slowly.

Another object of the invention is to apply to a two wheeled motor vehicle principles of frame and spring design especially used in connection with large motor vehicles to give the vehicle better riding qualities and greater stability.

Another object of the present invention is to produce a drop frame which will lower the center of gravity of the load as much as possible, and at the same time give increased stability to the frame.

Another object of the invention is to so connect the wheels to the motor vehicle frame as to enable them to be readily detached whenever it is necesary to place a new tire upon them.

Another object of the invention is to so arrange the auxiliary supporting wheels as to make it possible to raise them very quickly, or to lower them whenever it is necessary to use them.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a side elevation of the complete machine,

Figure 2 is a side elevation of a slightly modified form of the apparatus for raising and lowering the auxiliary wheels, Figure 3 is a plan view of the complete machine, Figure 4 is a sectional view showing the means for connecting the rear wheel to the vehicle to enable it to be removed therefrom at will, Figure 5 is a side elevation of one of the auxiliary wheels on a slightly larger scale than is shown in the other views, Figure 6 is a view of one of the auxiliary wheels in side elevation showing the means for permitting it to be resiliently held in a given position, Figure 7 is a plan view of the steering mechanism, Figure 8 is a front elevation of the steering wheel and its frame for connecting it to the springs, Fig. 9 is a side elevation of the hub of the rear wheel showing the clutch thereon for engaging the driving means.

The vertical frame consists of two long members 1 and 2 with a transverse bar 3, a transverse raised yoke plate 4, a platform 5 upon which the engine 6 is placed, a supporting plate 7 on which the gear change box 8 is placed, a rear transverse bar 9 and the gas tank 10 at the rear of the two bars 1 and 2.

At the front, the frame bars are raised in a substantially half circle as is indicated in Figure 1 at 10', and there is a drop in the frame at 11 to provide a low place for the seat 12 with its cushioned back 13.

The engine is diagrammatically indicated at 6, and the gear change box at 8. The gear change is effected by means of the lever 14. The brake pedal is shown at 16, and the clutch pedal at 17.

The frame is supported at the front end by means of two semi-elliptical springs 18 and 19. These two springs 18 and 19 are pivotally connected to the front of the bars 1 and 2 to a plate 21, and at their rear ends to an intermediate portion of the frame members 1 and 2 by links 20.

The front wheel of the vehicle is bolted to a downwardly extending frame of U shape indicated at 23. This frame carries the wheel 24, and it is secured to the wheel axle by means of nuts 25, 26. At the upper end the wheel yoke 23 has an anti-friction bearing 27 to permit the wheel to turn easily and is connected with a worm gear 28 on the shaft 29.

The shaft 29 has the gear 28 thereon, in mesh with a gear worm 30 on the steering shaft 31, said shaft being supported in a bearing 32 adjacent the front wheel. The shaft 31 is connected by a universal joint 33 to the shaft 34, and then to the wheel adjacent the driver's seat.

The steering shaft 34 carries the operator's wheels 35 and 36, and is journalled in several supports consistng of two plates 35', 37.

The engine is covered with a hood 38 to protect it, and it has an extension to protect the driver.

The small auxiliary wheels 40', 41 are journalled in yokes 42, 43. The shaft 34 carries a tubular shaft 39 to which the wheel 35 is secured, and the worm 39' is in mesh with the worm wheel 47 for the purpose of turning the sprocket chain 40 one way or the other to raise or lower the wheels 40' and 41.

Two yokes 42, 43 comprise the support for the wheels 40', 41 and they are connected to a movable plate on each side of the vehicle, which plates each have two spiral springs 42', 43' to hold the wheels resiliently in a given position with respect to said plates. A chain 40 is used to rotate the shaft 48. The yokes to which the wheels are connected bear upon the two springs 42', 43', and they are pivotally supported by the transverse shaft 48. As soon as the wheels touch the ground they will bear on the upper springs with sufficient force to take a part of the load and to hold the machine upright. The engine radiator is shown at 49.

When it is desired to change tires on the front wheel it can be removed from the yoke by removing the nuts 25, 26 in a well known manner, but for the removal of the rear wheel a different mechanism is provided.

The rear wheel 70 has the central hub 71 extending therethrough. The shaft 72 passes through the hub and is fixed therein by the spline 72' extending the full length of the shaft.

The bevel gear 74 is splined on the shaft 72 at the side of the rear wheel 70. The hub 75 extends laterally from the gear 74 and is journaled in a suitable anit-friction bearing in the boss 76 of the gear housing. The boss is rigidly mounted on the spring 77 to hold the housing 79 in fixed position. The housing is closed by the plate 80 bolted thereto. The bevel gear 74 is provided with suitable clutch teeth adapted to engage the clutch teeth 78 formed on the end of the hub 71. Thus the rear wheel 70 and the gear 74 are interlocked so that the rear wheel is rotated when the gear 74 is driven.

The pinion 81 is mounted on the end of the shaft 82 in the housing 79 and is enmeshed with the bevel gear 74. The drive shaft 84 extends into the transmission gear change box 8 and is connected to the shaft 82 by the universal joint 83.

The brake drum 85 is splined on the shaft 72 on the wheel 70. The hub 70 of the brake drum is journaled in suitable anti-friction bearings in the boss 87 of the disk 87'. The boss 87 is fixed to the carriage spring 88 in the conventional manner.

The springs 77—88 are secured to the frame of the vehicle in accordance with the principles of automobile body practice. The springs have their front ends pivoted to the body frame at 89. The links 90 connect the rear ends of the springs to the rear end of the frame.

The brake drum is provided with the clutch teeth 91 which engage similar opposed teeth on the hub 71 to fix the brake drum to the wheel 70. The nut 73 is threaded on the end of the axle 72 to hold the rear wheel assembly in place and to insure the perfect engagement of the clutch teeth 78—91.

It will of course, be understood by those skilled in the art that the bearings used for the rear wheel may be of any desired type other than the ball bearings indicated in the drawings.

The fixed disk 87' encloses the brake drum and carries the brake shoes mounted therein. This brake is of a well known form in which the two brake shoes 93, 94 are pivotally mounted on a pin 95 carried by the disk 87', and which brake shoes are pushed outwardly against the drum by means of a cam 96 on the pin 97 to which the short brake lever 98 is connected. This brake is operated by the rod 92 but of course, it will be understood by those skilled in the art, that any desired brake may be used in connection with the drum 85, and be operated by the rod 92.

When a tire is to be changed from the rear wheel the bolt 72 is taken out, whereupon the springs 77 and 88 can be separated very slightly to allow the wheel to be completely removed from the machine without disturbing the driving gear at all.

In Figure 2 there is shown a modified form of wheel lowering mechanism in which one of the auxiliary wheels is shown being cut away to show the other wheel which is in the same position as the wheels shown in Figure 3. In this figure the frame is indicated at 50' and mounted on the frame is a crank shaft 50" which carries the spur gear 51.

The spur gear 51 is in mesh with a smaller spur gear 51' on the shaft 52 which shaft carries the plate 53 with the springs 54—55 bearing on the yoke 56, which supports the wheels 57, 58 on opposite sides of the frame. A link 59 connects the lever 60 with the crank 50" and enables the driver to raise or lower the wheels 57, 58 at will.

The lever carries a hand latch 61 which engages various notches of an arc 62 bolted to the top of the frame to enable the wheels 57, 58 to be set in any desired adjustment.

The operation of the machine is as follows:

The driver places himself on the seat 13 and starts the engine, maintaining the car vertical with the wheels 40', 41 until the vehicle has got under way. He may then operate the wheel 35 to draw the auxiliary wheels off the ground, whereupon the machine will remain in a vertical position as it drives forward, and the wheels 40, 41 do not require lowering to the ground until the driver is ready to stop.

Having thus described my invention, what I desire to secure by Letters Patent of the United States is as follows, but modifications may be made in carrying out the invention as shown in the drawings and in the above particularly described form thereof, within the purview of the annexed claims:

1. A motor vehicle comprising a frame, steering and driving wheels arranged to support the front and rear ends of the frame, means for detachably mounting the driving wheel to the frame, comprising a shaft extending through the hub of said driving wheel, a drive gear on said shaft, a brake drum on said shaft, means on the wheel engaging said drive gear and brake drum to prevent relative axial movement of the parts, means for maintaining said shaft in fixed axial position relative to the wheel, drive gear, and brake drum mounted thereon, and journals on said frame engaging said drive gear and brake drum to form bearings for the driving wheel.

2. A motor vehicle comprising a frame, steering and driving wheels arranged to support the front and rear ends of the frame, means for detachably mounting the driving wheel to the frame comprising a shaft extending through the hub of the driving wheel and splined thereto, a drive gear on said shaft, a brake drum on said shaft, means on the wheel engaging said drive gear and brake drum to prevent relative axial movement of the parts, and hubs on said drive gear and brake drum journaled to the frame of the vehicle to form bearings for the rear wheel.

3. A motor vehicle comprising a frame, steering and driving wheels arranged to support the front and rear ends of the frame respectively, springs interposed between said wheels and said frame, means for detachably mounting the driving wheel to the frame comprising a shaft extending through the hub of the rear wheel and splined thereto, a drive gear and a brake drum splined on said shaft, a nut on said shaft to hold the shaft in fixed longitudinal position, and hubs on said drive gear and brake drum journaled in the rear wheel springs to form bearings for said wheel.

4. A motor vehicle comprising a frame, steering and driving wheels arranged to support the front and rear ends of the frame, respectively, springs interposed between said wheels and said frame, means for detachably mounting the driving wheel to the frame comprising a shaft extending through the hub of the rear wheel and splined thereto, a drive gear and brake drum splined on said shaft on opposite sides of said wheel, clutch teeth on the hub of the rear wheel engaging similar teeth on said drive gear and brake drum to prevent axial movement of the drive gear and the brake drum relative to the wheel, hubs on said drive gear and brake drum journaled in the driving wheel springs to form bearings for said wheel, and a nut on said shaft adapted to be screwed up to force said drive gear and brake drum into mesh with the clutch teeth on the hub of said wheel.

In testimony whereof I have hereunto set my hand this 14 day of July, A. D. 1928.

LESLIE G. NICHOLSON.